(12) United States Patent
Higashiya et al.

(10) Patent No.: US 12,032,358 B2
(45) Date of Patent: Jul. 9, 2024

(54) SCADA WEB HMI SYSTEM

(71) Applicant: TMEIC CORPORATION, Tokyo (JP)

(72) Inventors: Ryosuke Higashiya, Tokyo (JP); Akira Nojima, Tokyo (JP); Nobuo Shimizu, Tokyo (JP); Ryo Shimizu, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 464 days.

(21) Appl. No.: 17/413,581

(22) PCT Filed: Nov. 26, 2019

(86) PCT No.: PCT/JP2019/046195
§ 371 (c)(1),
(2) Date: Jun. 14, 2021

(87) PCT Pub. No.: WO2021/106082
PCT Pub. Date: Jun. 3, 2021

(65) Prior Publication Data
US 2022/0057780 A1 Feb. 24, 2022

(51) Int. Cl.
*G05B 19/4155* (2006.01)
*G06F 3/04847* (2022.01)

(52) U.S. Cl.
CPC ..... *G05B 19/4155* (2013.01); *G06F 3/04847* (2013.01); *G05B 2219/32404* (2013.01)

(58) Field of Classification Search
None
See application file for complete search history.

(56) References Cited

U.S. PATENT DOCUMENTS 10,480,980 B2 * 11/2019 Smith .................... G01D 4/002
10,663,960 B2 * 5/2020 Bayat ................ G05B 23/0272
(Continued)

FOREIGN PATENT DOCUMENTS

CN    102405404 B    12/2016
CN    106354082 B    1/2020
(Continued)

OTHER PUBLICATIONS

International Search Report and Written Opinion mailed on Feb. 18, 2020, received for PCT Application PCT/JP2019/046195, Filed on Nov. 26, 2019, 9 pages including English Translation.
(Continued)

*Primary Examiner* — Howard Cortes
(74) *Attorney, Agent, or Firm* — XSENSUS LLP

(57) ABSTRACT

An SCADA web HMI system includes a web browser for displaying an HMI screen. An integrated part identifier generation unit generates a new integrated part identifier when attribute identifiers of first part data and second part data are identical. A part data change unit changes part identifiers of the first part data and the second part data to the integrated part identifier. An integrated item name generation unit generates an integrated item name in which a screen identifier of the HMI screen, the integrated part identifier, and the identical attribute identifier are combined. The web browser changes, when a PLC signal received from a programmable logic controller corresponds to the integrated item name, a display state of the first part based on first display information and changes a display state of the second part based on second display information, according to the value of the received PLC signal.

10 Claims, 21 Drawing Sheets

(56) References Cited

U.S. PATENT DOCUMENTS

| | | | |
|---|---|---|---|
| 11,281,684 B2* | 3/2022 | Diancin | G06F 16/245 |
| 11,323,519 B2* | 5/2022 | Sherman | H04L 67/51 |
| 2018/0059921 A1* | 3/2018 | De Ligt | G05B 19/409 |

FOREIGN PATENT DOCUMENTS

| | | |
|---|---|---|
| JP | 2017-27211 A | 2/2017 |
| JP | 6548807 B2 | 7/2019 |

OTHER PUBLICATIONS

Indian Office Action dated Jul. 13, 2022, in the corresponding Indian patent application No. 202117023497.

* cited by examiner

| PART NUMBER | ATTRIBUTE NAME | ATTRIBUTE VALUE | |
|---|---|---|---|
| | | WHEN SIGNAL IS 0 | WHEN SIGNAL IS 1 |
| 1 | DISPLAY COLOR 1 | GRAY | RED ←— 41 |
| 2 | DISPLAY COLOR 1 | GRAY | GREEN ←— 42 |

PART NAME ITEM NAME (PLC SIGNAL NAME)

FIRST RECTANGLE   G1_1SL1=0   | GRAY |  ←— FIRST PART
SECOND RECTANGLE  G1_2SL1=0   | GRAY |  ←— SECOND PART

FIRST RECTANGLE   G1_1SL1=1   | RED |    ←— FIRST PART
SECOND RECTANGLE  G1_2SL1=1   | GREEN |  ←— SECOND PART

FIG. 4

| STATE OF POWER TRANSFORMATION CONTROL CIRCUIT | PLC SIGNAL (ON/OFF SIGNAL) | | | |
|---|---|---|---|---|
| | GROUP A | GROUP B | GROUP C | GROUP D |
| WHEN HIGHER VOLTAGE CLASS BUS IS OFF | OFF | OFF | OFF | OFF |
| WHEN HIGHER VOLTAGE CLASS BUS IS ON AND BOTH BREAKERS ARE OFF | ON | OFF | OFF | OFF |
| WHEN HIGHER VOLTAGE CLASS BUS IS ON AND ONLY BREAKER ON LEFT SIDE IS ON | ON | ON | OFF | ON |
| WHEN HIGHER VOLTAGE CLASS BUS IS ON AND ONLY BREAKER ON RIGHT SIDE IS ON | ON | OFF | ON | ON |

FIG. 9

| PART NUMBER | ATTRIBUTE NAME | ATTRIBUTE VALUE | |
|---|---|---|---|
| | | WHEN SIGNAL IS 0 | WHEN SIGNAL IS 1 |
| 1 | DISPLAY COLOR 1 | GRAY | RED | ← 51
| 1 | DISPLAY COLOR 2 | | ORANGE | ← 52
| 2 | DISPLAY COLOR 1 | GRAY | GREEN | ← 53
| 2 | DISPLAY COLOR 2 | | BLUE | ← 54
| 2 | DISPLAY COLOR 3 | | PURPLE | ← 55

| PART NAME | DISPLAY COLOR | ITEM NAME (PLC SIGNAL NAME) | | |
|---|---|---|---|---|
| FIRST RECTANGLE | GRAY | G1_1SL1=0 | G1_1SL2=0 | |
| SECOND RECTANGLE | GRAY | G1_2SL1=0 | G1_2SL2=0 | G1_2SL3=0 |
| FIRST RECTANGLE | RED | G1_1SL1=1 | G1_1SL2=0 | |
| SECOND RECTANGLE | GREEN | G1_2SL1=1 | G1_2SL2=0 | G1_2SL3=0 |
| FIRST RECTANGLE | ORANGE | G1_1SL1=0 | G1_1SL2=1 | |
| SECOND RECTANGLE | BLUE | G1_2SL1=0 | G1_2SL2=1 | G1_2SL3=0 |
| FIRST RECTANGLE | GRAY | G1_1SL1=0 | G1_1SL2=0 | |
| SECOND RECTANGLE | PURPLE | G1_2SL1=0 | G1_2SL2=0 | G1_2SL3=1 |

FIG. 12

| PART NUMBER | ATTRIBUTE NAME | ATTRIBUTE VALUE | |
|---|---|---|---|
| | | WHEN SIGNAL IS 0 | WHEN SIGNAL IS 1 |
| 11 | DISPLAY COLOR 1 | GRAY | RED ← 51 |
| | | GRAY | GREEN ← 53 |
| 11 | DISPLAY COLOR 2 | | ORANGE ← 52 |
| | | | BLUE ← 54 |
| 11 | DISPLAY COLOR 3 | | PURPLE ← 55 |

| PART NAME | DISPLAY COLOR | ITEM NAME (PLC SIGNAL NAME) | | |
|---|---|---|---|---|
| 11 INTEGRATED PART | GRAY / GRAY | G1_11SL1=0 | G1_11SL2=0 | G1_11SL3=0 |
| 11 INTEGRATED PART | RED / GREEN | G1_11SL1=1 | G1_11SL2=0 | G1_11SL3=0 |
| 11 INTEGRATED PART | ORANGE / BLUE | G1_11SL1=0 | G1_11SL2=1 | G1_11SL3=0 |
| 11 INTEGRATED PART | GRAY / PURPLE | G1_11SL1=0 | G1_11SL2=0 | G1_11SL3=1 |

FIG. 13

| | State of power transformation control circuit | Group A ON/OFF SIGNAL | Group B ON/OFF SIGNAL | Group B POWER CLASS SIGNAL | Group C ON/OFF SIGNAL | Group C POWER CLASS SIGNAL | Group D ON/OFF SIGNAL |
|---|---|---|---|---|---|---|---|
| POWER CLASS DISPLAY MODE OF BREAKER | WHEN HIGHER VOLTAGE CLASS BUS IS OFF | OFF | OFF | OFF | OFF | OFF | OFF |
| | WHEN HIGHER VOLTAGE CLASS BUS IS ON AND BOTH BREAKERS ARE OFF | ON | OFF | OFF | OFF | OFF | OFF |
| | WHEN HIGHER VOLTAGE CLASS BUS IS ON AND ONLY BREAKER ON LEFT SIDE IS ON | ON | ON | ON | OFF | OFF | ON |
| | WHEN HIGHER VOLTAGE CLASS BUS IS ON AND ONLY BREAKER ON RIGHT SIDE IS ON | ON | OFF | OFF | ON | ON | ON |
| NORMAL MODE | WHEN HIGHER VOLTAGE CLASS BUS IS OFF | OFF | OFF | OFF | OFF | OFF | OFF |
| | WHEN HIGHER VOLTAGE CLASS BUS IS ON AND BOTH BREAKERS ARE OFF | ON | OFF | OFF | OFF | OFF | OFF |
| | WHEN HIGHER VOLTAGE CLASS BUS IS ON AND ONLY BREAKER ON LEFT SIDE IS ON | ON | ON | OFF | OFF | OFF | ON |
| | WHEN HIGHER VOLTAGE CLASS BUS IS ON AND ONLY BREAKER ON RIGHT SIDE IS ON | ON | OFF | OFF | ON | OFF | ON |

FIG. 15

SCADA WEB HMI SYSTEM

CROSS-REFERENCE TO RELATED APPLICATION

The present application is based on PCT filing PCT/JP2019/046195, filed Nov. 26, 2019, the entire contents of which are incorporated herein by reference.

FIELD

The present invention relates to an SCADA web HMI system.

BACKGROUND

Supervisory Control And Data Acquisition (SCADA) is known as a mechanism that monitors and controls social infrastructure systems. The social infrastructure systems include a steel rolling system, a power transmission and transformation system, a water and sewage treatment system, a building management system, a road system, and the like.

The SCADA, which is a kind of industrial control systems, performs system monitoring and process control by a computer. In the SCADA, a quick responsiveness (real-time property) corresponding to system processing performance is necessary.

The SCADA is typically constituted of sub-systems as follows:
(1) Human Machine Interface (HMI)
A Human Machine Interface (HMI) is a mechanism that presents data of a target process (monitor target device) to an operator and allows the operator to monitor and control the process. For example, in PTL 1, an SCADA HMI including an HMI screen that operates on an SCADA client is disclosed.
(2) Monitor Control System
A monitor control system collects signal data (PLC signal) on a process and transmits a control command to the process. The monitor control system is constituted of a Programmable Logic Controller (PLC), and the like.
(3) Remote Input/Output Device (Remote Input Output: RIO)
A remote input/output device, which is connected with a sensor installed within the process, converts a sensor signal into digital data and transmits the digital data to the monitor control system.
(4) Communication Base
A communication base connects the monitor control system and the remote input/output device.

CITATION LIST

Patent Literature

[PTL 1] JP 2017-27211 A

SUMMARY

Technical Problem

A client program of an HMI sub-system in PTL 1 is constructed by a program that depends on a machine environment. In order to achieve cost reduction in the SCADA HMI subsystem, the inventor of the present application has developed a browser-based SCADA HMI subsystem that does not depend on a machine environment.

When the SCADA HMI subsystem is constructed as a web application that operates on a web browser, the following advantages are provided.
(1) The web browser has already been installed in a large number of terminal devices such as a personal computer (PC) and a tablet PC and therefore, various terminal devices can be used as an SCADA HMI subsystem.
(2) The web browser has a highly functional rendering function, in which a high-level GUI interaction function including animation can be easily built in.

In conventional SCADA HMI subsystems, an HMI screen is created by using a drawing creation device called an engineering tool.

On the HMI screen, a plurality of parts are arranged. In conventional SCADA, at least one data element called "tag" or "point" is assigned to each part. For each data element, a unique PLC signal is assigned. For n data elements (for example, display colors of parts) on the HMI screen, n PLC signals are assigned; and from a monitor control system (PLC) to an HMI subsystem, n PLC signals are transmitted. The HMI subsystem changes colors of parts or changes animation or the like according to the PLC signals received from the monitor control system (PLC).

FIG. 20 is an example of a power transformation control circuit diagram created as an HMI screen. The power transformation control circuit diagram shows a control circuit of two different voltage classes in a power transformation control system. In the power transformation control circuit diagram, transformers, breakers, and buses are drawn. The power transformation control circuit diagram is constituted of 20 parts (401 to 420) in which primitive parts (straight line, rectangle, circle) are combined. For each of the 20 parts, a unique data element is assigned. Conventionally, in order to control changing of the colors of these parts, the monitor control system (PLC) has been required to output 20 PLC signals each of which corresponds to each of the 20 parts, to the HMI subsystem. The more the number of parts, the more PLC signals have to be controlled; and the logic of the monitor control system (PLC) becomes complicated. In addition, a communication amount between the monitor control system (PLC) and the HMI subsystem increases.

However, in an actual system, an electrical ON/OFF is determined by a breaker state and therefore, some adjacent parts have an identical color. FIG. 21 is a view showing four color change patterns (A) to (D) in the power transformation control circuit diagram. In FIG. 21, parts indicated by broken lines are shown in green (OFF) and parts indicated by solid lines are shown in red (ON).
(A) in FIG. 21 shows a case in which a higher voltage class bus is OFF.
(B) in FIG. 21 shows a case in which the higher voltage class bus is ON and both breakers are OFF.
(C) in FIG. 21 shows a case in which the higher voltage class bus is ON and only a breaker on a left side is ON.
(D) in FIG. 21 shows a case in which the higher voltage class bus is ON and only a breaker on a right side is ON.

Thus, on the HMI screen of the SCADA HMI subsystem, color change patterns for some adjacent display parts are the same and can be controlled by an identical PLC signal.

An object of the present invention is to provide an SCADA web HMI system that by integrating information assigned to parts on an HMI screen, makes it possible to achieve a reduction in the number of PLC signals, an improvement in engineering efficiency, and an improvement in runtime performance.

Solution to Problem

In order to achieve the object, an SCADA web HMI system according to the present invention is configured as follows.

The SCADA web HMI system includes a web browser for displaying an HMI screen. The SCADA web HMI system changes the appearance of a part arranged on the HMI screen according to a value of a PLC signal received from a programmable logic controller.

The SCADA web HMI system includes first part data generation means, second part data generation means, integrated part identifier generation means, part data change means, integrated item name generation means, and web HMI data generation means.

The first part data generation means generates first part data in which arrangement information of a first part arranged on the HMI screen, a first part identifier for the first part, a first attribute identifier indicating a dynamic display attribute of the first part, and first display information defining a display state of the first part corresponding to an attribute value assigned to the first attribute identifier are associated.

The second part data generation means generates second part data in which arrangement information of a second part arranged on the HMI screen, a second part identifier for the second part, a second attribute identifier indicating a dynamic display attribute of the second part, and second display information defining a display state of the second part corresponding to an attribute value assigned to the second attribute identifier are associated.

The integrated part identifier generation means newly generates an integrated part identifier when the first attribute identifier of the first part data and the second attribute identifier of the second part data are an identical attribute identifier.

The part data change means changes the first part identifier of the first part data and the second part identifier of the second part data to the integrated part identifier.

The integrated item name generation means generates an integrated item name in which a screen identifier of the HMI screen, the integrated part identifier, and the identical attribute identifier are combined.

The web HMI data generation means generates web HMI data that includes the arrangement information of the first part, the arrangement information of the second part, the integrated item name, the first display information, the second display information, and a script for changing the display states of the first part and the second part according to the received PLC signal.

The web HMI data includes static display attribute data and runtime attribute data. The static display attribute data is data in which the arrangement information of the first part, the arrangement information of the second part, and the integrated item name are associated. The runtime attribute data is data in which the integrated item name, the first display information, the second display information, and the script are associated.

The web browser includes static display means and dynamic display means. The static display means reads the static display attribute data and displays the HMI screen. The dynamic display means reads the runtime attribute data; and when the received PLC signal corresponds to the integrated item name, updates the display state of the first part based on the first display information and updates the display state of the second part based on the second display information according to a value of the received PLC signal by using the script in which the integrated item name, the first display information, and the second display information are applied as setting parameters.

Advantageous Effect of Invention

According to the present invention, by integrating parts having an identical attribute on the HMI screen, a reduction in the number of PLC signals, an improvement in engineering efficiency, and an improvement in runtime performance can be achieved.

BRIEF DESCRIPTION OF DRAWINGS

FIG. 4 is a view showing an example of part data before integration processing in the first embodiment of the present invention.

FIG. 9 is a table showing combinations of PLC signals for displaying group A to group D in FIG. 8, in four color change patterns.

FIG. 12 is a view showing an example of part data before integration processing in the second embodiment of the present invention.

FIG. 13 is a view showing an example of part data after the integration processing in the second embodiment of the present invention.

FIG. 15 is a table showing combinations of PLC signals for realizing color change patterns in the power transformation control circuit diagram in FIG. 14.

DESCRIPTION OF EMBODIMENTS

Hereinafter, embodiments of the present invention will be described in detail with reference to drawings. However, when numbers such as the number, quantity, volume, or range of elements are referred to in the embodiments presented below, the present invention is not limited by the numbers referred to except where especially explicitly specified and where explicitly specified to the numbers in principle. In addition, structures and the like that are described in the embodiments presented below are not necessarily required for this invention except where especially explicitly specified and where obviously specified thereto in principle. It should be noted that common elements in the figures are denoted by the same reference signs to omit redundant explanation.

First Embodiment

<Entire System>

Figure 1:
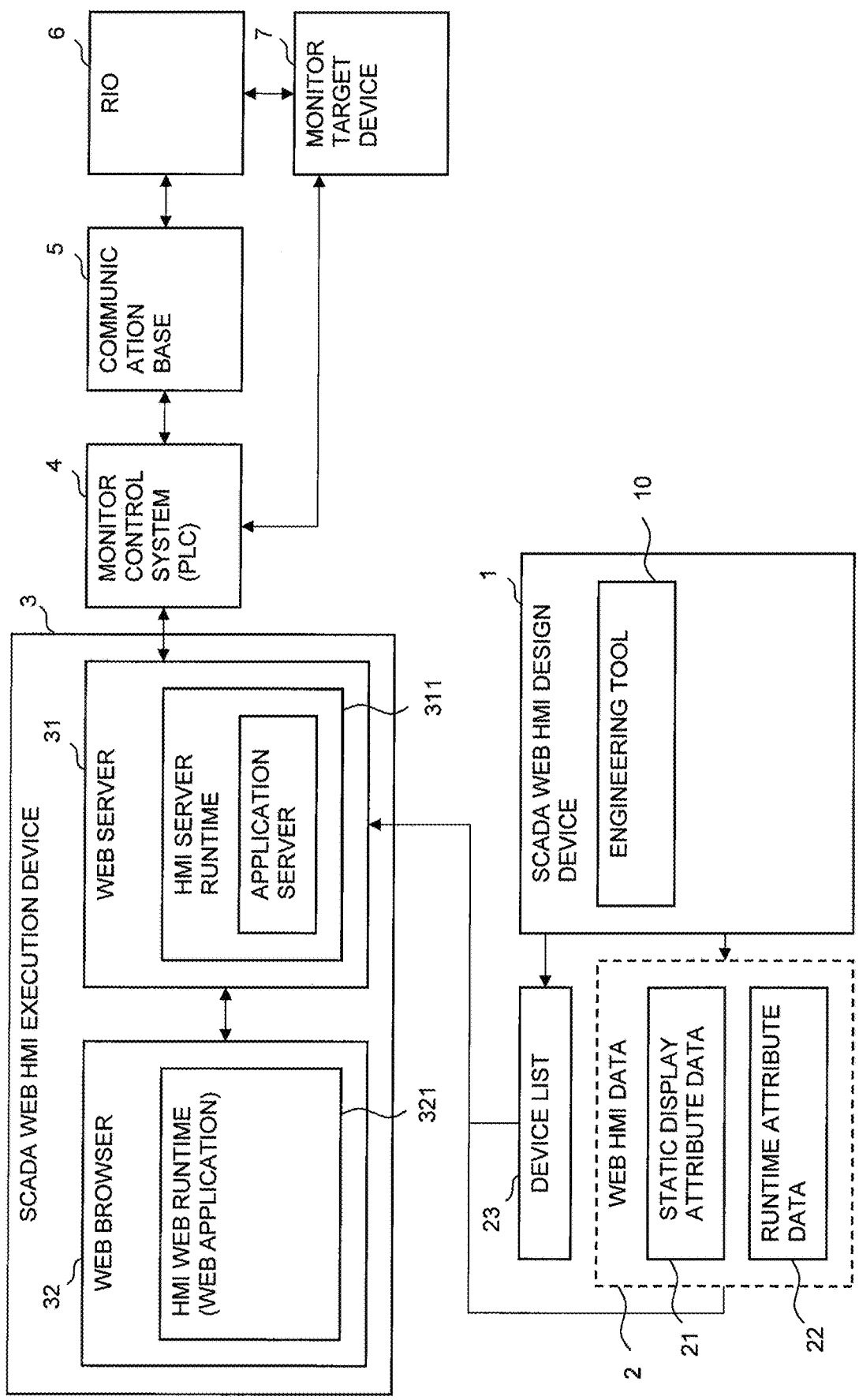
FIG. 1 is a view showing a system configuration of SCADA in a first embodiment of the present invention.

FIG. 1 is a view showing a system configuration of SCADA. The SCADA includes an SCADA web HMI execution device 3, a monitor control system 4, a communication base 5, and RIO 6, as subsystems. The SCADA connects to a monitor target device 7 via the monitor control system 4 or the RIO 6. Herein, the SCADA web HMI execution device 3 that is an HMI execution environment and an SCADA web HMI design device 1 that is an HMI development environment are included and referred to as an SCADA web HMI system.

Descriptions of the monitor control system 4, the communication base 5, and the RIO 6 are as described in Background and therefore, is omitted. The monitor control system 4 includes a programmable logic controller (PLC). The monitor target device 7 is a sensor, an actuator, or the like that constitutes a plant that is a monitor control target.

The SCADA web HMI design device 1 executes an engineering tool 10. The engineering tool 10 generates web HMI data 2 and a device list 23 that are necessary to function the SCADA web HMI execution device 3 that is an HMI execution environment. Details of the SCADA web HMI design device 1 will be described later.

The SCADA web HMI execution device 3 (HMI subsystem) executes a web server 31 and a web browser 32. The SCADA web HMI execution device 3 operates as an HMI subsystem in coordination between an HMI server runtime 311 operating on the web server 31 and an HMI web runtime 321 operating on the web browser 32.

The web browser 32 displays an HMI screen that is a screen for monitoring a plant. On the HMI screen, parts for displaying a plant state are arranged. The web server 31 communicates with the web browser 32 and the monitor control system 4. For example, the web server 31 transmits, when a PLC signal received from the monitor control system 4 is a signal related to the HMI screen currently displayed on the web browser 32, the PLC signal to the web browser 32. This causes the SCADA web HMI execution device 3 to change the appearances of parts arranged on the HMI screen according to a value of the PLC signal received from the monitor control system 4. Details of the SCADA web HMI execution device 3 will be described later.

<SCADA Web HMI Design Device (Engineering Tool)>

Figure 10:
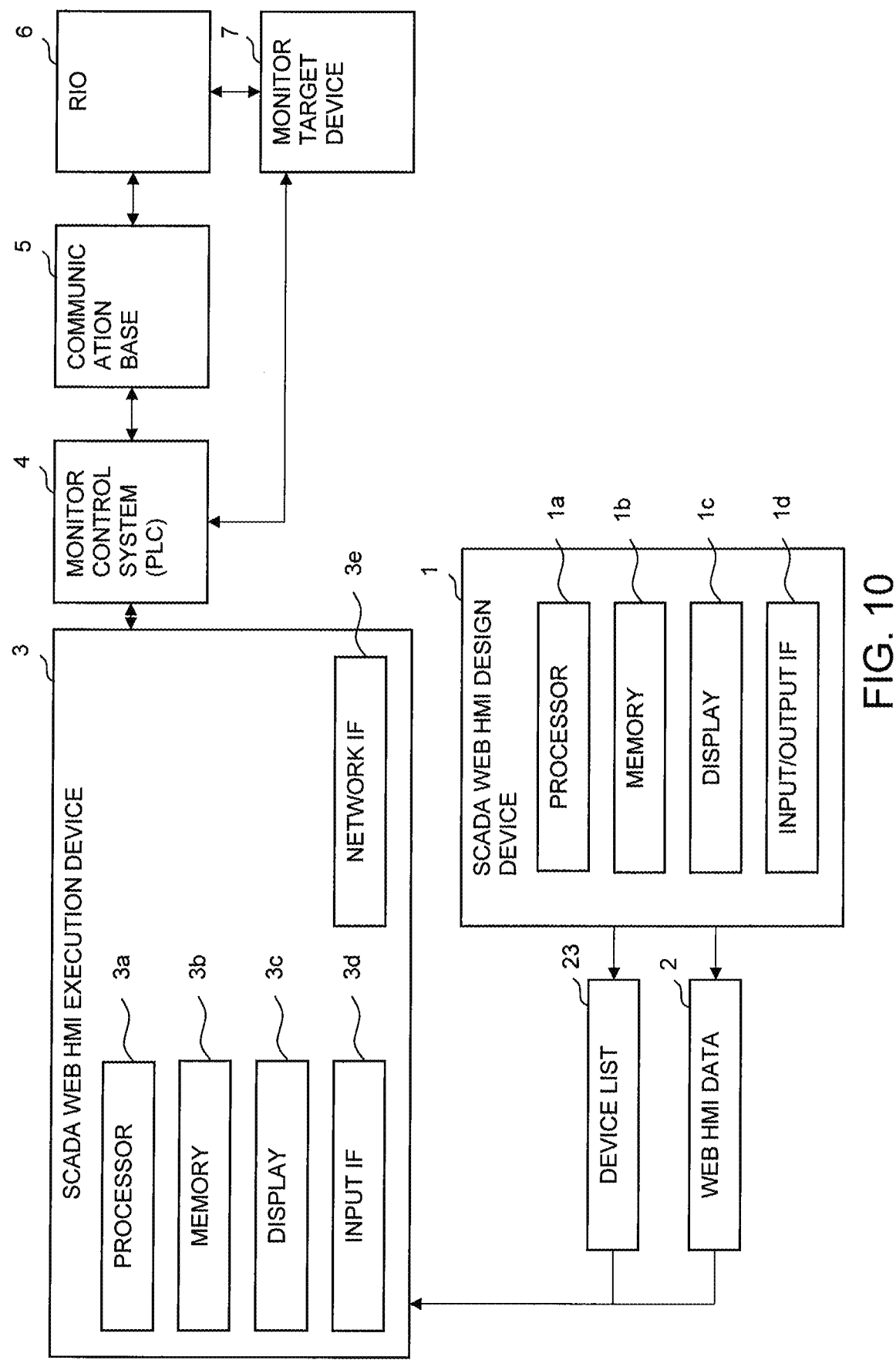
FIG. 10 is a block diagram showing a hardware configuration example of an SCADA web HMI execution device and an SCADA web HMI design device.

The SCADA web HMI design device 1 includes, as shown in FIG. 10 described later, at least one processor 1a and a memory 1b that stores a program in which processing to be executed by the engineering tool 10 is written. The program is executed by the processor 1a, thereby making the processor 1a execute the processing written in the program.

The engineering tool 10 that operates on the SCADA web HMI design device 1 includes: an advanced drawing editing function; a function allowing drawing data to be saved in a Scalable Vector Graphics (SVG) format; and an extension function. The drawing editing function and the SVG data saving function are realized by, as one example, Microsoft Visio (registered trademark).

Figure 2:
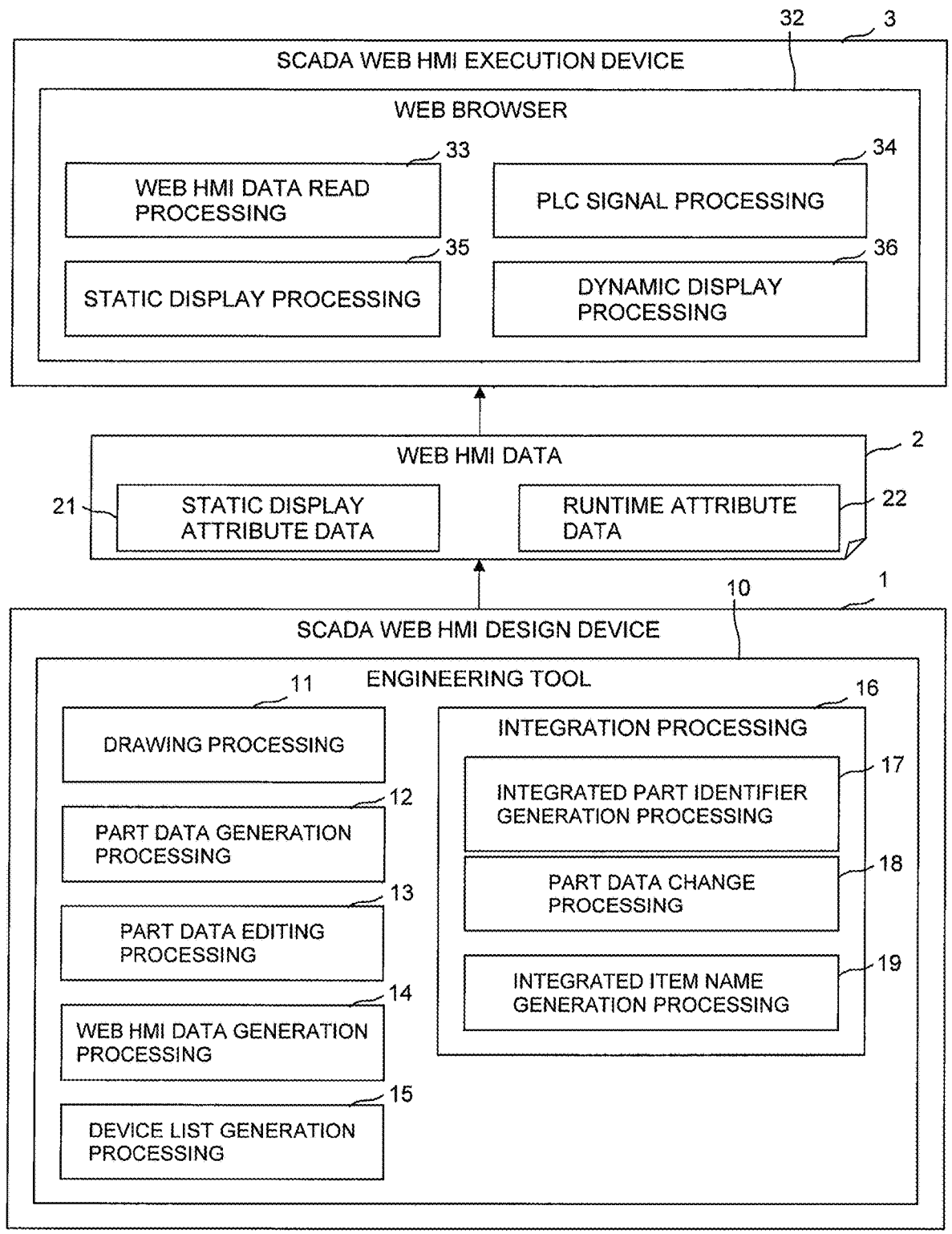
FIG. 2 is a block diagram for describing major processing that is executed in an engineering tool and a web browser in the first embodiment of the present invention.

FIG. 2 is a block diagram for describing major processing that is executed in the engineering tool 10 and the web browser 32 in the present embodiment. First, processing of the engineering tool 10 will be described.

The engineering tool 10 can execute, as major processing, drawing processing 11, part data generation processing 12, part data editing processing 13, web HMI data generation processing 14, device list generation processing 15, and integration processing 16.

(Drawing Processing)

Figure 3:
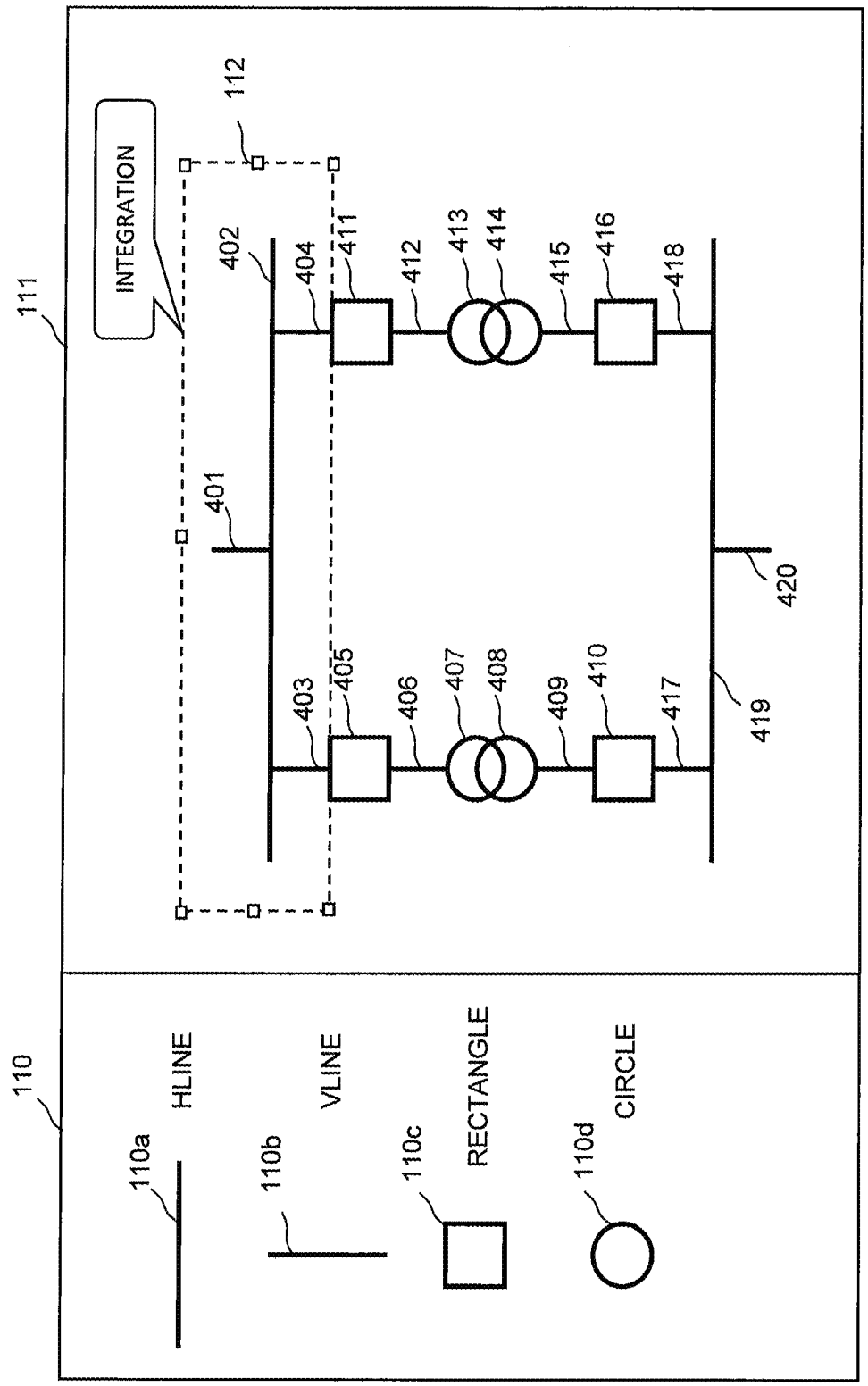
FIG. 3 is an example of a drawing creation screen that is displayed by the engineering tool in the first embodiment of the present invention.

With reference to FIG. 3, the drawing processing 11 for creating a drawing used as an HMI screen will be described. FIG. 3 is an example of a drawing creation screen that is displayed by the engineering tool 10. The drawing creation screen is displayed on a display 1c (FIG. 10).

The drawing processing 11 displays, side by side, a stencil area 110 in which prototypes (master shapes) of parts necessary for creating a drawing are arranged and a drawing area 111 in which a drawing for an HMI screen is drawn. The drawing processing 11 allows parts in the stencil area 110 which are selected by an HMI screen designer to be arranged on a drawing in the drawing area 111 by using the input/output interface 1d (FIG. 10).

In the example in FIG. 3, in the stencil area 110, HLINE 110a that is a prototype (master shape) of a horizontal line part, VLINE 110b that is a prototype of a vertical line part, RECTANGLE 110c that is a prototype of a rectangular part, and CIRCLE 110d that is a prototype of a circular part are displayed.

It should be noted that types of parts are not limited thereto and in the stencil area 110, prototypes such as triangle parts and tire parts may be displayed.

The HMI screen designer can copy (drag and drop) a prototype in the stencil area 110 in FIG. 3 and arrange it at any position in the drawing area 111. Parts are arranged in the drawing area 111 and thereby, a drawing is created. Parts 401 to 420 in FIG. 3 are those obtained by copying prototypes 110a to 110d of parts from the stencil area 110 and arranging them in the drawing area 111 by the HMI screen designer. In the drawing area 111 in FIG. 3, a control circuit of two different voltage classes in a power transformation control system is drawn.

(Part Data Generation Processing)

The part data generation processing 12 in FIG. 2 automatically generates, when a part is arranged in the drawing area 111 in FIG. 3, unique part data.

The part data generation processing 12 generates part data, in which the "arrangement information," "part identifier," "attribute identifier," and "display information" of a part arranged in the drawing area 111, are associated.

The "arrangement information" is a static display attribute including the shape, position, size, and the like of the part arranged in the drawing area 111. The static display attribute is information that does not cause the appearance of the part to be changed irrespective of a value of a received PLC signal. The static display attribute can be changed on the drawing area 111.

The "part identifier" is a unique identifier specifying each of the parts arranged on one drawing and is, for example, a part number.

The "attribute identifier" is an identifier that represents a dynamic display attribute of the part.

The "display information" is information that defines a display state of the part which corresponds to an attribute value assigned to the attribute identifier. If the attribute is a display color, it is also referred to as a color rule.

In addition, the part data generation processing 12 generates an "item name," unique to the system, in which a screen identifier of the HMI screen, a part identifier, and an attribute identifier are combined.

FIG. 4 is a view showing an example of part data in the present embodiment. Here, the part data on a drawing on which a part showing a first rectangle as a "first part" and a part showing a second rectangle as "second part" are arranged will be described. It should be noted that as for arrangement information of the parts, the illustration thereof is omitted.

First part data 41 is part data of the first rectangle that is the first part. The first part identifier is "part number 1." A first attribute identifier is "display color 1." First display information indicates, "When the PLC signal is 0, the part color is changed to gray and when the PLC signal is 1, the part color is changed to red." In addition, an item name "G1_1SL1" is an identifier that is obtained by combining "G1" indicating a screen identifier of the HMI screen, "1" indicating the part number 1, and "SL1" indicating the display color 1. "G1_1SL1" is a signal name corresponding to signal data (PLC signal) that is transmitted from the monitor control system 4 to the SCADA web HMI execution device 3. The item name and the PLC signal are associated one-to-one.

Second part data 42 is part data of the second rectangle that is the second part. The second part identifier is "part number 2." A second attribute identifier is "display color 1." Second display information indicates, "When the PLC signal is 0, the part color is changed to gray and when the PLC signal is 1, the part color is changed to green." In addition, an item name "G1_2SL1" is an identifier that is obtained by combining "G1" indicating the screen identifier of the HMI screen, "2" indicating the part number 2, and "SL1" indicating the display color 1. "G1_2SL1" is a signal name corresponding to signal data (PLC signal) that is transmitted from the monitor control system 4 to the SCADA web HMI execution device 3.

(Part Data Editing Processing)

The part data editing processing 13 in FIG. 2 edits the part data which is automatically generated by the part data generation processing 12. The "display information" of the automatically generated part data is a default content and therefore, the HMI screen designer edits the content of the "display information" according to HMI screen specifications of the monitor control target plant.

(Integration Processing)

In addition, the engineering tool 10 integrates item names which are assigned to parts on the HMI screen of the HMI subsystem, thereby being able to execute integration processing 16 for a reduction in the number of PLC signals, an improvement in engineering efficiency and an improvement in runtime performance.

Integration processing 16 in FIG. 2 is processing for integrating a plurality of parts. The HMI screen designer selects a plurality of parts that are integration targets, by using range specification 112 in FIG. 3; and executes the integration processing 16 by the engineering tool 10. Specifically, by selecting parts desired to be integrated by using the range specification 112 and then, selecting an "INTEGRATION" menu from a menu list, an item name that is assigned to each part can be integrated.

Integratable parts are only display parts which change their display states according to a PLC signal transmitted from the monitor control system 4 (PLC) to the SCADA web HMI execution device 3 (HMI subsystem). The display parts each has, as an attribute related to an appearance of the part, any of "display color," "non-display," "width/height," "position," and "rotation;" and has, as a type of an attribute value, any of "Boolean," "integer," and "floating point number."

Integratable parts are display parts, which are parts having an identical attribute identifier. For example, in FIG. 4, the first rectangle that is the first part and the second rectangle that is the second part, whose attribute names (attribute identifiers) are "display color 1" which are identical, can be integrated. It should be noted that in a case of having an identical attribute identifier, attribute value types are also identical. In an example in FIG. 4, the attribute names (attribute identifiers) of the first part and the second part are "display color 1" and the type of an attribute value is Boolean.

In a description below, the description will be made on an assumption that the first part and the second part are to be integrated, for easy description; however, three or more parts may be integrated.

Figure 5:
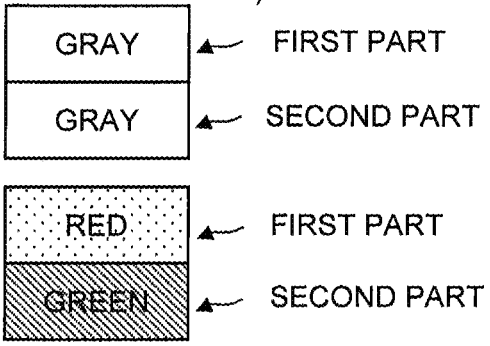
FIG. 5 is a view showing an example of part data after the integration processing in the first embodiment of the present invention.

With reference to FIG. 4 and FIG. 5, specific changes in part data in the integration processing of integrating the first part and the second part will be described. FIG. 4 is a view showing an example of the part data before the integration processing. FIG. 5 is a view showing an example of the part data after the integration processing.

The integration processing 16 in FIG. 2 includes, as major processing, integrated part identifier generation processing 17, part data change processing 18, and integrated item name generation processing 19.

The integrated part identifier generation processing 17 newly generates, when the first attribute identifier of the first part data 41 and the second attribute identifier of the second part data 42 are an identical attribute identifier, an integrated part identifier.

For example, the first attribute identifier "display color 1" of the first part data 41 and the second attribute identifier "display color 1" of the second part data 42 in FIG. 4 are identical. In this case, the integrated part identifier generation processing 17 newly generates an integrated part identifier "part number 11" shown in FIG. 5.

The part data change processing 18 changes the first part identifier of the first part data 41 and the second part identifier of the second part data 42 to the integrated part identifier.

For example, the part data change processing 18 changes the first part identifier "part number 1" of the first part data 41 in FIG. 4 to the integrated part identifier "part number 11" in FIG. 5. Similarly, the part data change processing 18 changes the second part identifier "part number 2" of the second part data 42 in FIG. 4 to the integrated part identifier "part number 11" in FIG. 5.

The integrated item name generation processing 19 generates an integrated item name in which the screen identifier of the HMI screen, the integrated part identifier, and the identical attribute identifier are combined.

In an example shown in FIG. 5, the integrated item name generation processing 19 generates an integrated item name "G1_11SL1" in which the screen identifier "G1" of the HMI screen, "11" indicating the integrated part identifier "part number 11," and "SL1" indicating the identical attribute identifier "display color 1" are combined.

Thus, two item names "G1_1SL1" and "G1_2SL1" in FIG. 4 are integrated into the one integrated item name "G1_11SL1" in FIG. 5. By this integrated processing, item names are reduced from two to one and as a result, PLC signals which are assigned to item name in the device list generation processing 15 described later are also reduced from two to one.

(Flowchart of Integration Processing)

Figure 6:
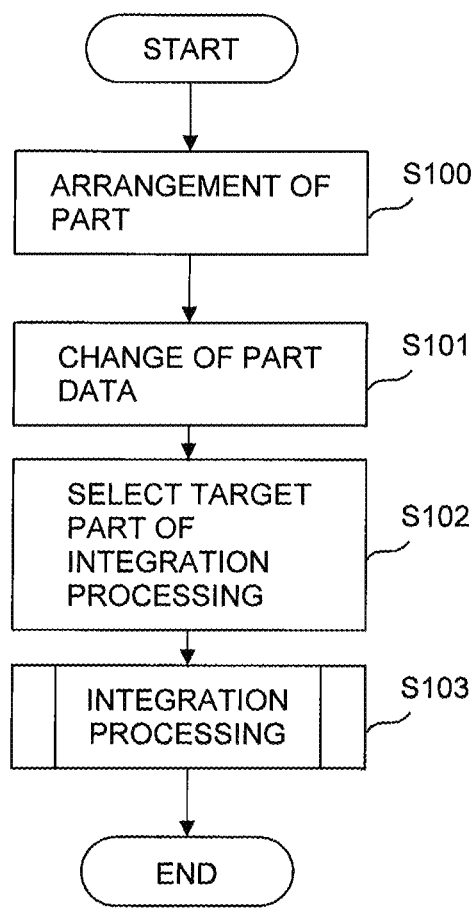
FIG. 6 is a flowchart for describing a flow of the integration processing using the engineering tool in the first embodiment of the present invention.
Figure 7:
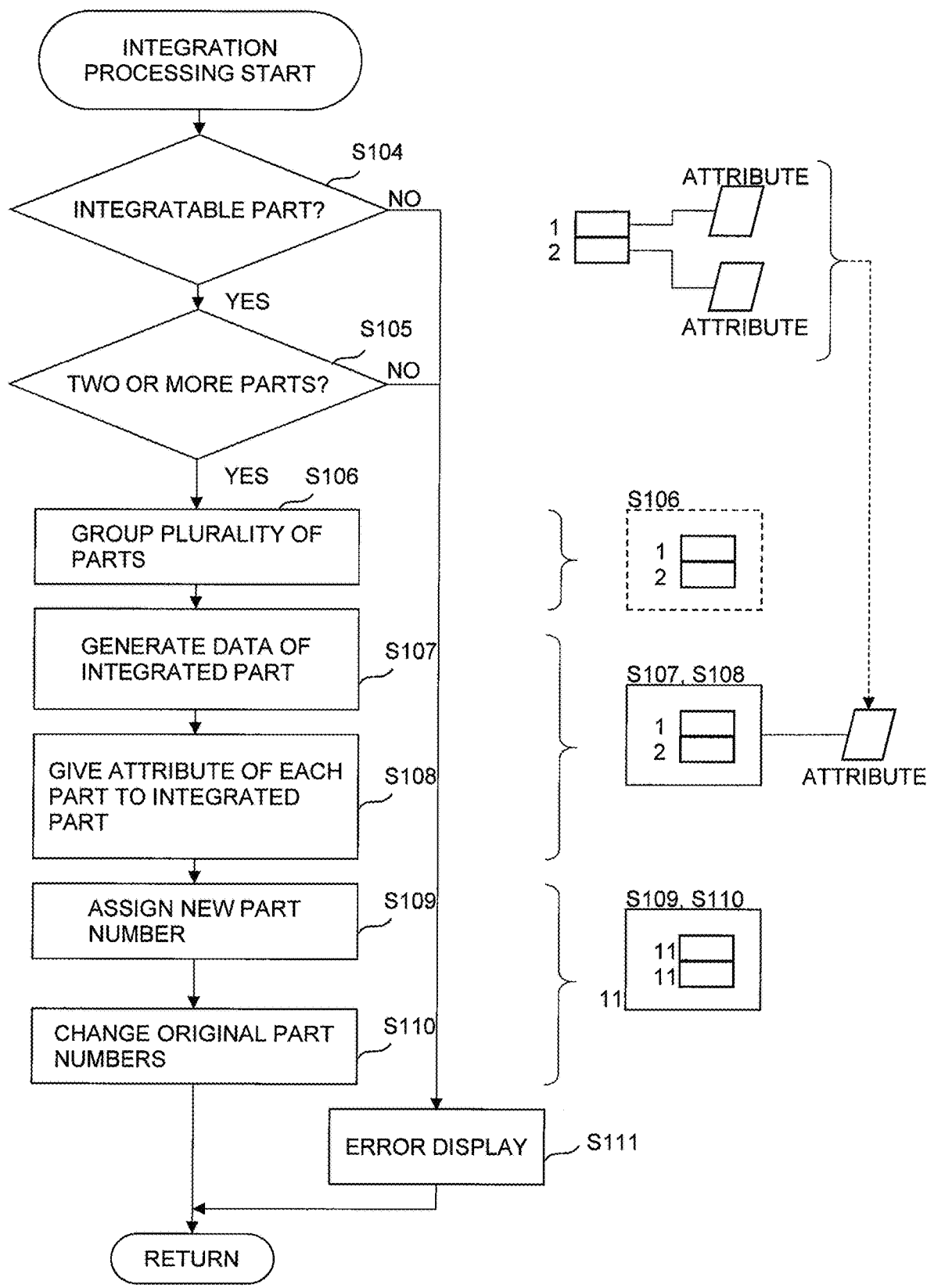
FIG. 7 is a flowchart for describing a flow of the integration processing using the engineering tool in the first embodiment of the present invention.

FIG. 6 and FIG. 7 are flowcharts each for describing a flow of the integration processing 16 using the engineering tool 10.

First, in step S100 in FIG. 6, the HMI screen designer arranges, by using the engineering tool 10, parts constituting the HMI screen on the drawing area 111. When the parts are arranged on the drawing area 111, unique part data is automatically generated by the part data generation processing 12.

In step S101, the HMI screen designer changes display information of the part data according to the HMI screen specifications of the monitor control target plant. For example, as for display information of the attribute identifier "display color," the display color of a part when an attribute value (PLC signal value) is 0, the display color of the part when the attribute value (PLC signal value) is 1, and the presence or absence of a flicker attribute are changed.

In step S102, the HMI screen designer selects target parts of the integration processing by using range specification 112 in FIG. 3.

In step S103, the engineering tool 10 executes an integration processing subroutine shown in FIG. 7. A flow of the integration processing 16 will be described with reference to FIG. 7.

First, in step S104, the integration processing 16 determines whether the selected parts are integratable parts. The integratable parts refer to display parts which change their display states according to a PLC signal transmitted from the monitor control system 4 (PLC) to the SCADA web HMI execution device 3 (HMI subsystem). If the selected parts are integratable parts, a determination condition is established. If the determination condition is established, an advance to step S105 is made.

At step S105, whether or not two or more parts are being selected is determined. If two or more parts are being selected, a determination condition is established. If the determination condition is established, an advance to step S106 is made.

At step S106, the engineering tool 10 groups a plurality of parts.

At step S107, separately from the part data of original parts (first part, second part), part data of an integrated part is newly generated.

At step S108, attributes of the parts are given to the integrated part.

At step S109, a new part number is assigned. A new integrated part identifier "part number 11" is assigned to the part data of the integrated part.

At step S110, the part numbers of the original parts (first part, second part) are changed to 11.

If the determination condition in processing at step S104 or step S105 in the above description is not established, the engineering tool 10 displays on the display 1c, at step S111, to the effect that the selected parts cannot be integrated.

After step S110 or step S111, the integration processing subroutine in FIG. 7 ends. After that, a routine in FIG. 6 ends.

According to the integration processing 16 described above, the part data in FIG. 4 can be changed to the part data in FIG. 5 in which item names have been reduced. After that, by the web HMI data generation processing 14 and the device list generation processing 15 which are described later, a device list 23 and web HMI data 2 in which the number of PLC signals has been reduced can be generated.

After the routine in FIG. 6, the web HMI data generation processing 14 and the device list generation processing 15 in FIG. 2 are executed, thereby generating the web HMI data 2 and the device list 23 that use the integrated item name.

(Web HMI Data Generation Processing)

The web HMI data generation processing 14 in FIG. 2 will be described. Here, the web HMI data generation processing 14 for the part data in FIG. 5 after the integration processing 16 is executed for the part data in FIG. 4 is described.

The web HMI data generation processing 14 generates the web HMI data 2. The web HMI data 2 includes static display attribute data 21 and runtime attribute data 22. The static display attribute is information that does not cause the appearance of a part to be changed irrespective of a value of a received PLC signal. An example is part arrangement information (shape, position, size, and the like). A runtime attribute is information for changing the appearance of a part according to a value of a received PLC signal and a script (program) that can be executed on the web browser 32. Examples are a dynamic display attribute of a part and a signal data processing algorithm.

The static display attribute data 21 is data in which the arrangement information of the first part, the arrangement information of the second part, and the integrated item name which are described above are associated. The static display attribute data is data in the Scalable Vector Graphics (SVG) format and includes, as an attribute of an SVG element, arrangement information (shape, position, and size) of a part.

The static display attribute data 21 that is generated from the part data exemplified in FIG. 5 will be described. The static display attribute data 21 is data in the SVG format which includes: data in which the integrated item name "G1_11SL1" and arrangement information of the first part (first rectangle in FIG. 4) are associated; and data in which the integrated item name "G1_11SL1" and arrangement information of the second part (second rectangle in FIG. 4) are associated.

The runtime attribute data 22 is data in which the integrated item name, the first display information of the first part, the second display information of the second part, and a script are associated. As described above, the "display information" is information that defines a display state of the part which corresponds to an attribute value assigned to the attribute identifier. The script is a JavaScript (registered trademark) program defined for each part type. The script can be executed on the web browser 32 by applying runtime attribute data (item name and display information) as a setting parameter. The script changes the display states of the first part and the second part according to a PLC signal received from the monitor control system 4.

The runtime attribute data 22 that is generated from the part data exemplified in FIG. 5 will be described. The runtime attribute data 22 includes: data in which the integrated item name "G1_11SL1," the first display information of the first part (first rectangle in FIG. 4), and a script are associated; and data in which the integrated item name "G1_11SL1," the second display information of the second part (second rectangle in FIG. 4), and the script are associated. As described above, in FIG. 4 and FIG. 5, the first display information indicates, "When the PLC signal is 0, the part color is changed to gray and when the PLC signal is 1, the part color is changed to red." The second display information indicates, "When the PLC signal is 0, the part color is changed to gray and when the PLC signal is 1, the part color is changed to green."

The script included in the runtime attribute data 22 will be described. In an example in FIG. 5, the first part and the second part are rectangle parts and in the runtime attribute data 22, the script of a rectangle part is included.

The script functions as a script of the first part by applying the integrated item name "G1_11SL1_1" and the first display information as setting parameters. The script of the first part operates on the web browser 32 described later; and when a value of the PLC signal is 0 (attribute value is 0), changes the display color of the first part to gray and when a value of the PLC signal is 1 (attribute value is 1), changes the display color of the first part to red.

In addition, the script functions as a script of the second part by applying the integrated item name "G1_11SL1_1" and the second display information as setting parameters. The script of the second part operates on the web browser 32 described later; and when a value of the PLC signal is 0 (attribute value is 0), changes the display color of the second part to gray and when a value of the PLC signal is 1 (attribute value is 1), changes the display color of the second part to green.

(Device List Generation Processing)

The device list generation processing 15 in FIG. 2 will be described. Here, the device list generation processing 15 for the part data in FIG. 5 after the integration processing 16 is executed for the part data in FIG. 4 is described.

The device list generation processing 15 generates, for each part, the device list 23 that is a list of data in which item names and PLC signals are associated. In the device list 23, item names and PLC signals (PLC addresses for receiving the PLC signals) are associated in a one-to-one relation. The device list is read by the web server 31 and is used for transmitting and receiving a signal between the web browser 32 and the monitor control system 4.

In the example in FIG. 4 before executing the integration processing 16, two item names are assigned and accordingly, two PLC signals are necessary. On the other hand, in the example in FIG. 5 after executing the integration processing 16, the two item names are integrated into one integrated item name and accordingly, one PLC signal, which corresponds to the integrated item name, is provided. Thus, the number of PLC signals can be reduced.

<SCADA Web HMI Execution Device (HMI Subsystem)>

Returning to FIG. 1, the SCADA web HMI execution device 3 will be described. The SCADA web HMI execution device 3 includes, as shown in FIG. 10 described later, at least one processor 3a and a memory 3b that stores a program in which processing to be executed by the SCADA web HMI execution device 3 is written. The program is executed by the processor 3a, thereby making the processor 3a execute the processing written in the program.

As described above, the SCADA web HMI execution device 3 executes the web server 31 and the web browser 32.

(Web Server)

The web server 31 reads the web HMI data 2 and the device list 23. The web server 31 reads the web HMI data 2 and arranges the static display attribute data 21 and the runtime attribute data 22 as HMI web runtime contents. The web server 31 reads the device list 23 and sets a state in which a signal can be transmitted and received between the web browser 32 and the monitor control system 4.

Processing of the HMI server runtime 311 that operates on the web server 31 is as follows:

(1) Incorporates an application server and provides the HMI web runtime contents to the web browser 32.

(2) Communicates with the monitor control system 4 (PLC), transmits signal data from the monitor target device 7 to the HMI web runtime 321, and transmits a control command from the HMI web runtime 321 to the monitor control system 4.

(Web Browser)

With reference to FIG. 2, processing of the web browser 32 will be described. The web browser 32 can read the web HMI data 2 (static display attribute data 21 and runtime attribute data 22) and execute static display processing and dynamic display processing. Here, the web HMI data 2 is described as data that is created based on the part data in FIG. 5 described above.

The static display processing reads the static display attribute data 21 that is drawing data in the SVG format from the web server 31, and displays an HMI screen. On the HMI screen, the first part and the second part in FIG. 5 are arranged according to the arrangement information.

The dynamic display processing reads the runtime attribute data 22; and when a received PLC signal corresponds to the integrated item name, updates the display state of the first part based on the first display information and updates the display state of the second part based on the second display information according to a value of the received PLC signal by using a script in which the integrated item name, the first display information, and the second display information are applied as setting parameters.

A script can be executed on the web browser 32 by applying an item name and display information as setting parameters. In the example in FIG. 5, the script functions as a script of the first part by applying the integrated item name "G1_11SL1_1" and the first display information as setting parameters. In addition, the script functions as a script of the second part by applying the integrated item name "G1_11SL1_1" and the second display information as setting parameters.

The script changes the display states of the first part and the second part according to the PLC signal received from the monitor control system 4. As shown in FIG. 5, the script of the first part is executed on the web browser 32; and when a value of the PLC signal is 0 (attribute value is 0), changes the display color of the first part to gray and when a value of the PLC signal is 1 (attribute value is 1), changes the display color of the first part to red. The script of the second part is executed on the web browser 32; and when a value of the PLC signal is 0 (attribute value is 0), changes the display color of the second part to gray and when a value of the PLC signal is 1 (attribute value is 1), changes the display color of the second part to green.

<Integration Example of Power Transformation Control Circuit Diagram>

An example in which the integration processing 16 described above is applied to the power transformation control system will be described with reference to FIG. 8 and FIG. 9.

Figure 8:
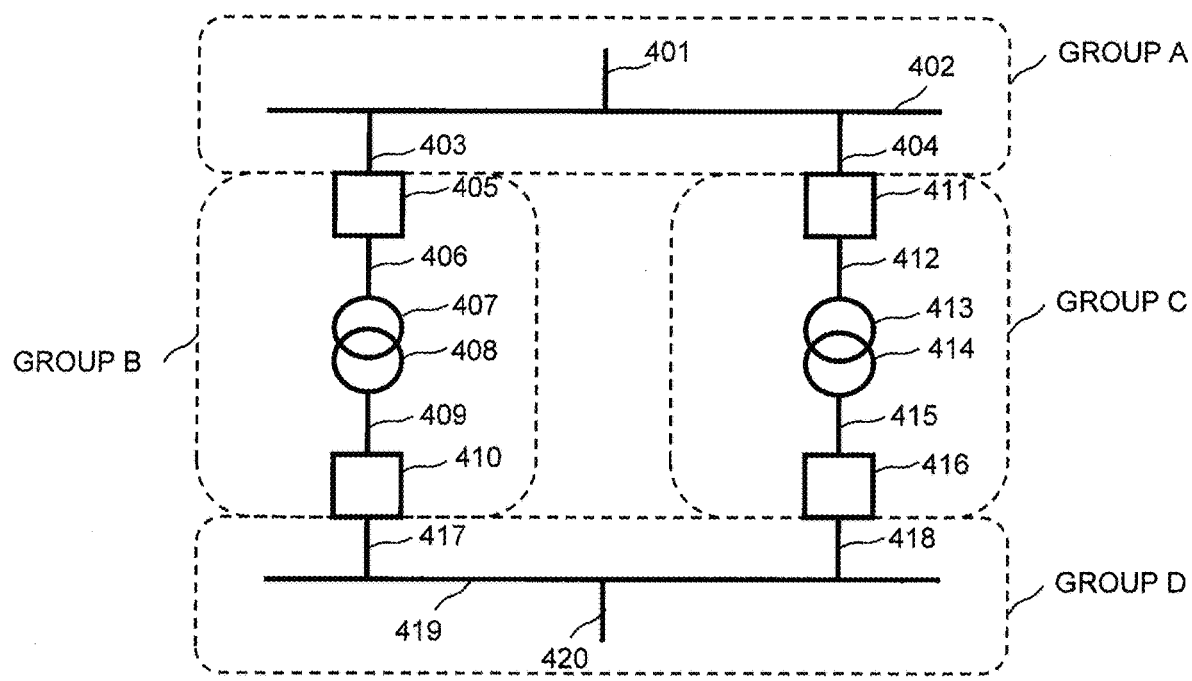
FIG. 8 is an example of a power transformation control circuit diagram that is created as an HMI screen in the first embodiment of the present invention.
Figure 20:
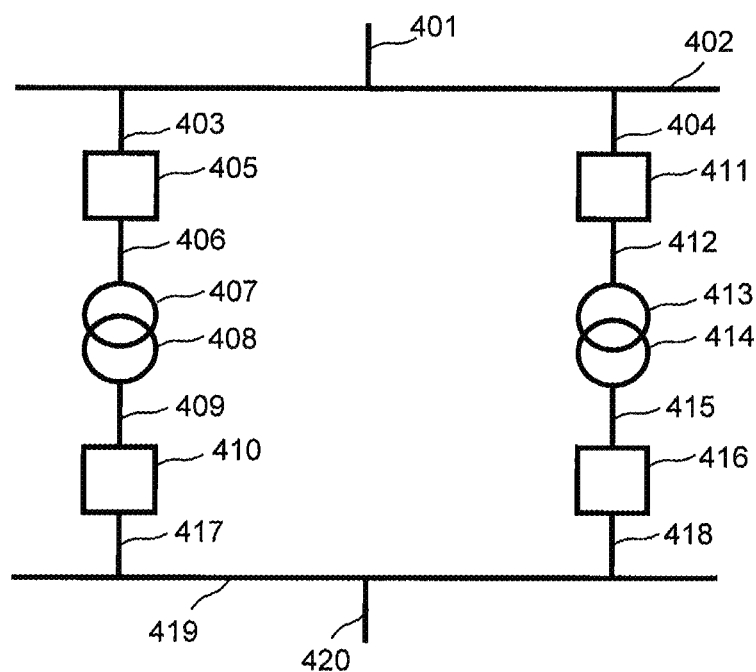
FIG. 20 is an example of a power transformation control circuit diagram that is created as an HMI screen.

FIG. 8 is an example of a power transformation control circuit diagram drawn as an HMI screen as with FIG. 20 described above. The power transformation control circuit diagram shows a control circuit of two different voltage classes in the power transformation control system. A color change pattern in the power transformation control circuit diagram includes four patterns as in FIG. 21 described above.

Therefore, adjacent display parts having an identical display color attribute are grouped into four groups as in FIG. 8. Group A is a set of parts constituting a higher voltage class bus. Group B is a set of parts constituting a breaker on a left side. Group C is a set of parts constituting a breaker on a right side. Group D is a set of parts constituting a lower voltage class bus. As for the group A, one integrated item name is generated and one PLC signal is assigned, for parts 401 to 404 by the integration processing. As for the group B, one integrated item name is generated and one PLC signal is assigned, for parts 405 to 410 by the integration processing. As for the group C, one integrated item name is generated and one PLC signal is assigned, for parts 411 to 416 by the integration processing. As for the group D, one integrated item name is generated and one PLC signal is assigned, for parts 417 to 420 by the integration processing.

Figure 21:
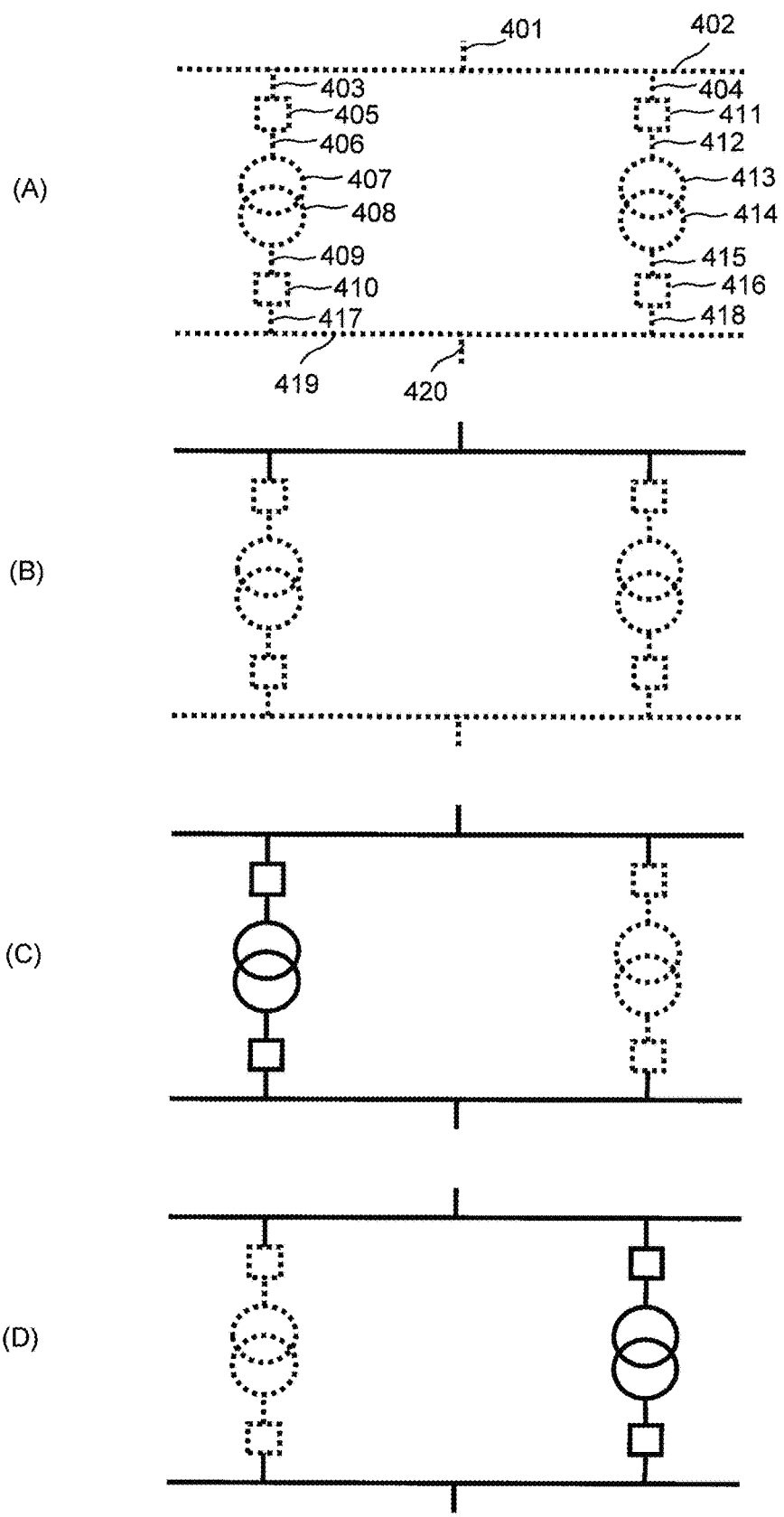
FIG. 21 is a view showing four color change patterns (A) to (D) in the power transformation control circuit diagram.

Thus, by combinations of four PLC signals associated with four integrated item names, four color change patterns, the power transformation control circuit diagram for which is shown in FIG. 21, can be provided.

FIG. 9 is a table showing the combinations of PLC signals for displaying the group A to the group D, in the four color change patterns. The number of PLC signals required is one for each group and is four for the whole. As described above in regard to FIG. 20, conventionally, 20 PLC signals have been required; however, the number of PLC signals can be reduced to four according to the system of the present embodiment.

Thus, according to the SCADA web HMI system of the present embodiment, by integrating signals assigned to parts on the HMI screen, the number of PLC signals is reduced, and an improvement in engineering efficiency and an improvement in runtime performance can be achieved.

Incidentally, in the system of the first embodiment described above, the web server 31 and the web browser 32 are executed on an identical computer; however, it is not limited thereto. A plurality of web browsers 32 may be connected to one web server 31. Therefore, the web server 31 and the web browser 32 may be operated on different computers. In this respect, embodiments below are also the same.

In addition, in the system of the first embodiment described above, drawing data in the SVG format is used; however, the drawing data is not limited thereto. If the web browser 32 is compliant with WebGL, drawing data may be in a format compliant with Web GL.

<Hardware Configuration Example>

A hardware configuration of a main part of the SCADA web HMI system will be described with reference to FIG. 10. FIG. 10 is a block diagram showing an example of a hardware configuration of the SCADA web HMI system.

Processes of the SCADA web HMI design device 1 shown in FIG. 2 are performed by a processing circuit. The processing circuit is constituted by connecting a processor 1a, a memory 1b, a display 1c, and an input/output interface 1d. The input/output interface 1d is an input device such as a keyboard or mouse and is an output device capable of performing file output of the web HMI data 2 and the device list 23. The processor 1a executes various programs stored in the memory 1b, thereby performing the processes of the SCADA web HMI design device 1.

Processes of the SCADA web HMI execution device 3 shown in FIG. 2 are performed by a processing circuit. The processing circuit is constituted by connecting a processor 3a, a memory 3b, a display 3c, an input interface 3d, and a network interface 3e. The input interface 3d includes an input device such as a keyboard or mouse and a device capable of reading the web HMI data 2 and the device list 23. The network interface 3e is a device connected with the monitor control system 4 and capable of transmitting and receiving signal data and a control command. In addition, the processing circuit performs the processes of the SCADA web HMI execution device 3 by the processor 3a executing the various programs stored in the memory 3b.

Second Embodiment

Next, a second embodiment of the present invention will be described with reference to FIG. 11 to FIG. 15. A system in the present embodiment is the same as that in the first embodiment except that data definitions are different and therefore, common descriptions will be omitted.

In the first embodiment described above, one color rule is defined for one part. However, a plurality of color rules can also be defined for one part. In the present embodiment, parts for which a plurality of color rules are defined are integrated.

Figure 11:
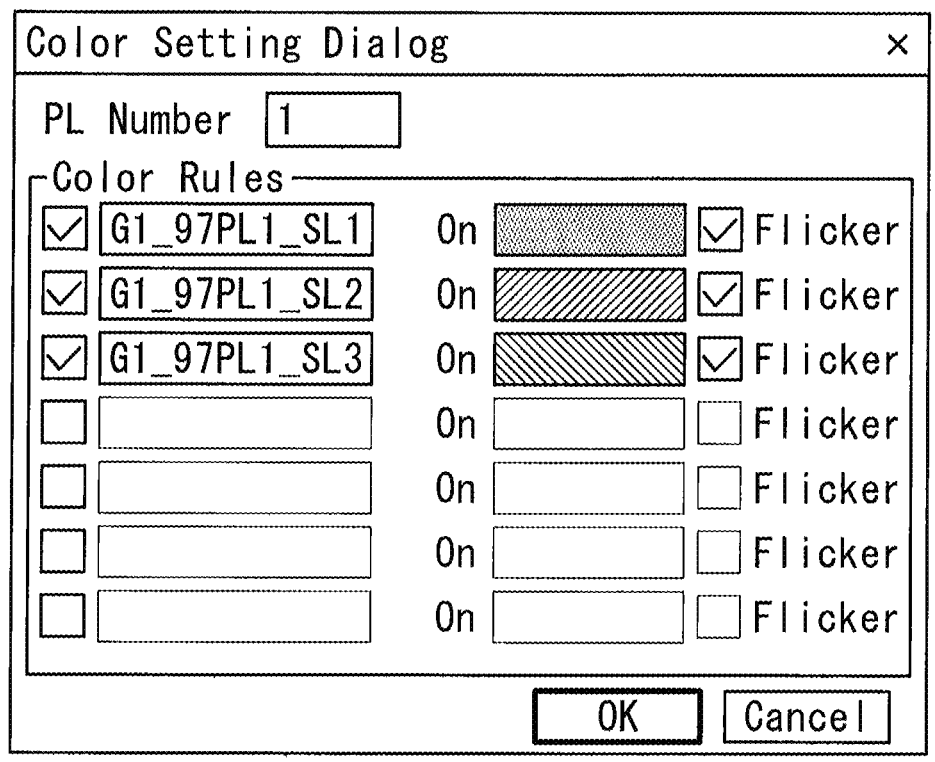
FIG. 11 is a screen example for defining a plurality of attributes for one part in a second embodiment of the present invention.

FIG. 11 is a screen example for defining a plurality of attributes for one part in the present embodiment. For one part, a plurality of attribute identifiers (SL1 to SL3) indicating display colors are defined. For one color rule, a display color and a flicker attribute can be specified. For each of the color rules, a PLC signal (item name) having a value of one bit (ON/OFF) can be assigned. Each of the color rules has a priority order (SL1<SL2<SL3). When there are a plurality of color rules for each of which an assigned PLC signal value is ON, a display color and flicker attribute of a color rule having the highest priority order is reflected on a drawing part.

FIG. 12 is a view showing an example of part data before integration processing in the present embodiment. Here, the part data on a drawing on which a part showing a first rectangle as a "first part" and a part showing a second rectangle as a "second part" are arranged is described. It should be noted that as for arrangement information of the parts, the illustration thereof is omitted. For the first part, two color rules are defined. For the second part, three color rules are defined. In FIG. 12, those having an identical attribute name (attribute identifier) are in an identical priority order.

First part data A51 is part data defining a first color rule of the first part. A first part identifier is "part number 1." A first attribute identifier A is "display color 1." First display information A indicates, "When the PLC signal is 0, the part color is changed to gray and when the PLC signal is 1, the part color is changed to red." In addition, an item name "G1_1SL1" is an identifier that is obtained by combining "G1" indicating the screen identifier of the HMI screen, "1" indicating the part number 1, and "SL1" indicating the display color 1.

First part data B52 is part data defining a second color rule of the first part. The first part identifier is "part number 1." A first attribute identifier B is "display color 2." First display information B indicates, "When the PLC signal is 1, the part color is changed to orange." In addition, an item name "G1_1SL2" is an identifier that is obtained by combining "G1" indicating the screen identifier of the HMI screen, "1" indicating the part number 1, and "SL2" indicating the display color 2.

Second part data A53 is part data defining a first color rule of the second part. A second part identifier is "part number 2." A second attribute identifier A is "display color 1." Second display information A indicates, "When the PLC signal is 0, the part color is changed to gray and when the PLC signal is 1, the part color is changed to green." In addition, an item name "G1_2SL1" is an identifier that is obtained by combining "G1" indicating the screen identifier of the HMI screen, "2" indicating the part number 2, and "SL1" indicating the display color 1.

Second part data B54 is part data defining a second color rule of the second part. The second part identifier is "part number 2." A second attribute identifier B is "display color 2." Second display information B indicates, "When the PLC signal is 1, the part color is changed to blue." In addition, an item name "G1_2SL2" is an identifier that is obtained by combining "G1" indicating the screen identifier of the HMI screen, "2" indicating the part number 2, and "SL2" indicating the display color 2.

Second part data C55 is part data defining a third color rule of the second part. The second part identifier is "part number 2." A second attribute identifier C is "display color 3." Second display information C indicates, "When the PLC signal is 1, the part color is changed to purple." In addition, an item name "G1_2SL3" is an identifier that is obtained by combining "G1" indicating the screen identifier of the HMI screen, "2" indicating the part number 2, and "SL3" indicating the display color 3.

With reference to FIG. 13, specific changes in the part data in the integration processing 16 will be described.

The integration processing 16 is executed with the first part and the second part selected.

The first attribute identifier "display color 1" of the first part data A51 and the second attribute identifier "display color 1" of the second part data A53 in FIG. 12 are identical. In this case, the integrated part identifier generation processing 17 newly generates an integrated part identifier "part number 11" shown in FIG. 13. It should be noted that when the attribute identifiers are identical, their priority orders are also identical.

The part data change processing 18 changes the first part identifier "part number 1" of the first part data A51 and the second part data B52 in FIG. 12 to the integrated part identifier "part number 11" in FIG. 13. Similarly, the part data change processing 18 changes the second part identifier "part number 2" of the second part data A53 to the second part data C55 in FIG. 12 to the integrated part identifier "part number 11" in FIG. 13.

The integrated item name generation processing 19 generates, based on the first part data A51 and the second part data A53, an integrated item name "G1_11SL1" in which the screen identifier "G1" of the HMI screen, "11" indicating the integrated part identifier "part number 11," and "SL1" indicating the identical attribute identifier "display color 1" are combined.

In addition, the integrated item name generation processing 19 generates, based on the first part data B52 and the second part data B54, an integrated item name "G1_11SL2" in which the screen identifier "G1" of the HMI screen, "11" indicating the integrated part identifier "part number 11," and "SL2" indicating an identical attribute identifier "display color 2" are combined.

In addition, the integrated item name generation processing 19 generates, based on the second part data C55, an integrated item name "G1_11SL3" in which the screen identifier "G1" of the HMI screen, "11" indicating the integrated part identifier "part number 11," and "SL3" indicating an attribute identifier "display color 3" are combined.

According to the integration processing described above, five item names shown in FIG. 12 are integrated into three item names shown in FIG. 13. After that, by the web HMI data generation processing 14 and the device list generation processing 15 which have been described in the first embodiment, a device list 23 and web HMI data 2 in which the number of PLC signals has been reduced can be generated.

<Integration Example of Power Transformation Control Circuit Diagram>

Figure 14:
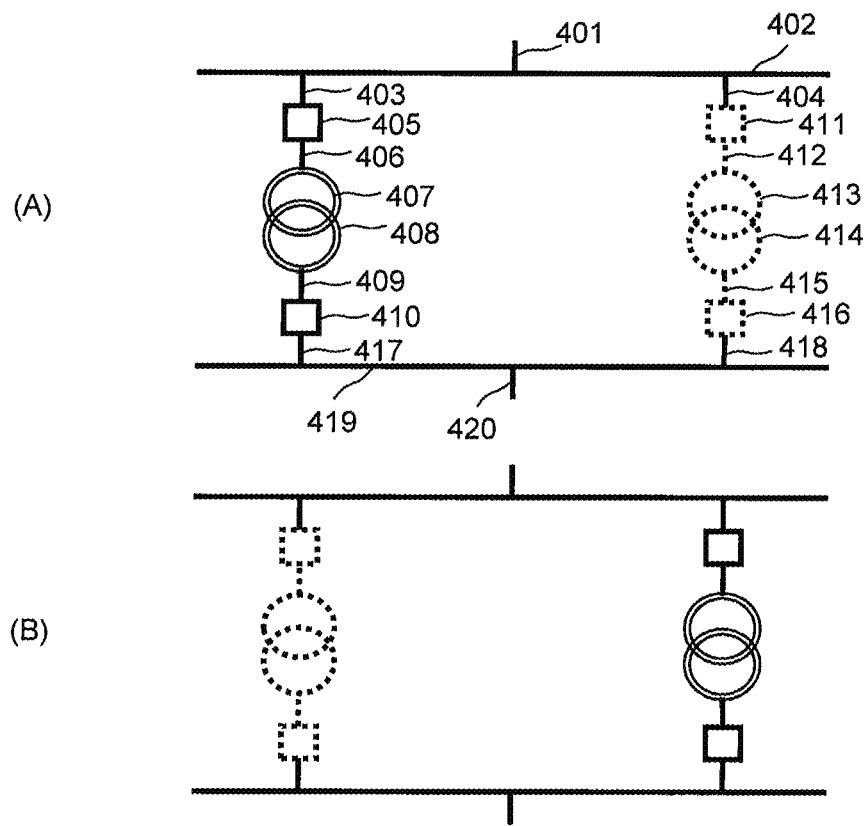
FIG. 14 is an example of a power transformation control circuit diagram that is created as an HMI screen in the second embodiment of the present invention.

FIG. 14 is an example of a power transformation control circuit diagram drawn as an HMI screen, as with FIG. 8 described above. The power transformation control circuit diagram represents a control circuit of two different voltage classes in a power transformation control system. As for grouping, it is the same as in FIG. 8 and therefore, description thereof will be omitted.

An example shown in FIG. 14 is a mode for performing a color change of transformers (407, 408, 413, 414) according to a voltage class. (A) in FIG. 14 shows a case in which a higher voltage class bus is ON and only a breaker on a left side is ON. (B) in FIG. 14 shows a case in which the higher voltage class bus is ON and only a breaker on a right side is ON.

In this case, a color rule indicating a voltage class signal is added to the transformers as a second color rule. The color rule indicating a voltage class signal has a higher priority order than a color rule indicating an ON/OFF signal. Therefore, when a voltage class signal is ON and an ON/OFF signal is ON, a higher priority is given to a color rule indicating the voltage class signal. The color rule indicating a voltage class signal is defined only for the drawing parts of transformers (407, 408, 413, 414).

For a color rule that is to be added to the parts of higher voltage class transformers (407, 413), purple is assigned; and for a color rule that is to be added to parts of lower voltage class transformers (408, 414), light blue is assigned.

For color rules of an integrated group, two PLC signals are assigned; however, display parts other than transformers have only one color rule and therefore, are not affected by a value of a second PLC signal.

As in FIG. 15, PLC signal values are controlled by a logic of the monitor control system 4 and thereby, a mode for performing a color change of transformers according to a voltage class can be supported.

Third Embodiment

Next, a third embodiment of the present invention will be described with reference to FIG. 16 to FIG. 19. A system in the present embodiment is the same as that in the first embodiment except that data definitions are different and therefore, common descriptions will be omitted.

In the first embodiment described above, a case in which when a part attribute is set as a display color, the display color is changed has been described. However, the part attribute is not limited thereto. In the third embodiment, a description will be given by using an animation attribute as an example.

Figure 16:
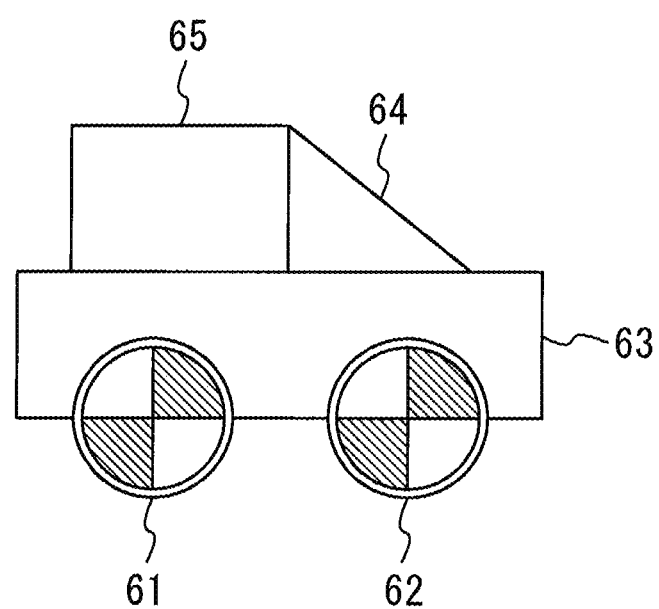
FIG. 16 is an example of a drawing that is created as an HMI screen in a third embodiment of the present invention.

FIG. 16 is an example of a drawing that is created as an HMI screen in the third embodiment of the present invention. A drawing of a moving object (vehicle) in FIG. 16 consists of five parts. To two tire parts (61, 62), a rotating animation attribute for rotating clockwise by ⅛ rotation every time a PLC signal value of a numerical type is incremented by 1 is given. To other three parts (63, 64, 65), a moving animation attribute for moving in an up-down direction (in a y coordinate axis direction) by 10 pixels according to a PLC signal value of a numerical type is given. A radius of each of the tires is set to 20 pixels.

As described above, in conventional SCADA, it has been required for this drawing that five PLC signals are provided and each value of the signals is controlled by a PLC logic. When integration is performed by using the integration processing 16 in the first embodiment described above, these PLC signals are integrated into two PLC signals. By values of this two signals, the following animation can be realized.

Figure 17:
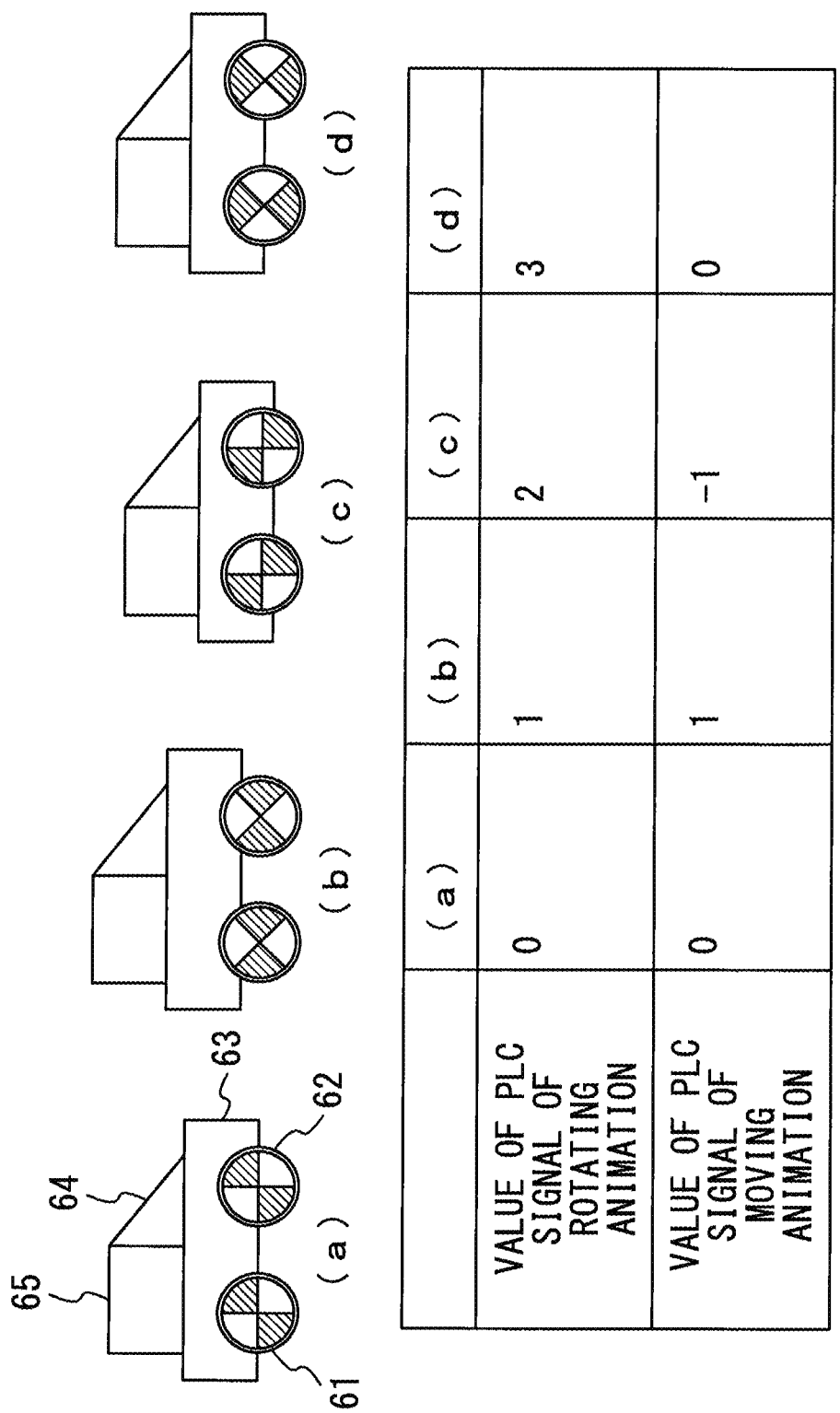
FIG. 17 is a view for describing animation of a moving object in the third embodiment of the present invention.

FIG. 17 is a view for describing animation of the moving object in the present embodiment. When two PLC signals shown by patterns (a) to (d) shown in a lower table in FIG. 17 are received, tire parts (61, 62) of the moving object rotate as in patterns (a) to (d) in an upper figure and vehicle body parts (63, 64, 65) move in the y coordinate axis direction.

Figure 18:
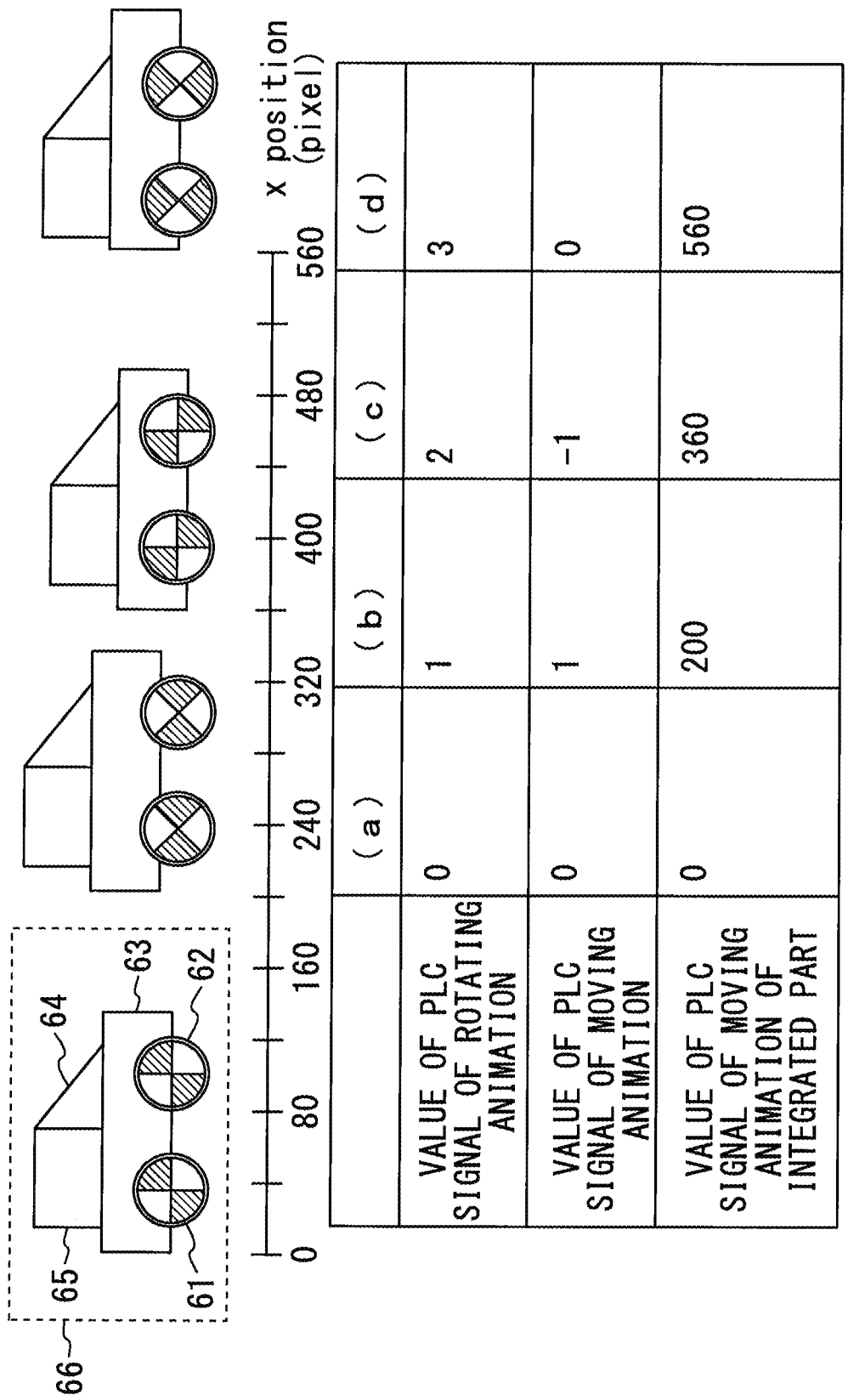
FIG. 18 is a view for describing animation of the moving object in the third embodiment of the present invention.
Figure 19:
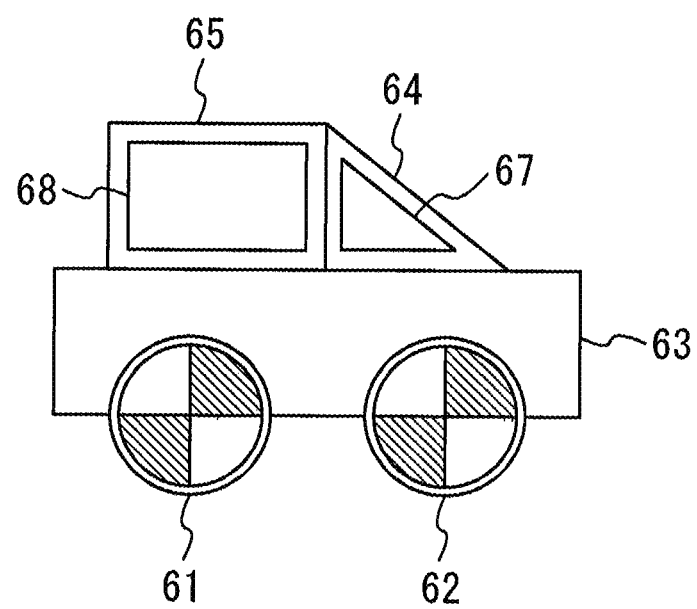
FIG. 19 is an example of a drawing that is created as an HMI screen in the third embodiment of the present invention.

FIG. 18 is a view for describing, in addition to the animation in FIG. 17, animation in which the moving object moves also in a horizontal direction.

In the system of the present embodiment, an animation attribute can also be given to an integrated part. An integrated part 66 is a part obtained by grouping all the tire parts and vehicle body parts. In an example in FIG. 18, a moving animation attribute for moving in an x coordinate axis direction according to a PLC signal value is given to the integrated part 66.

When three PLC signals shown by patterns (a) to (d) shown in a lower table in FIG. 18 are received, the tire parts (61, 62) of the moving object rotate as in patterns (a) to (d) in an upper figure and the vehicle body parts (63, 64, 65) move up and down and the integrated part (66) moves in the x coordinate axis direction.

In an example shown in FIG. 16, in the conventional SCADA, it has been required that a different PLC signal is given to each of the five parts (61 to 65) and five PLC signals are managed on a side of the monitor control system 4 (PLC). In addition, it is expected that according to specifications of an application, the number of parts in the tire parts and vehicle body parts constituting the figure of the moving object easily changes; however, conventionally, it has been required to change a logic of the monitor control system 4 (PLC) every time thereof. For example, only by slightly changing a design as in FIG. 19, two parts (67, 68) are added and the number of parts increases and therefore, it has been required to change the PLC logic.

On the other hand, when the PLC signals are integrated by using an integration function of the present embodiment, even if the number of drawing parts constituting a vehicle body and tires of a vehicle is changed, the PLC logic is not affected. Productivity is increased and the number of signals is reduced; and therefore, improvement in communication performance at an execution time can also be expected.

The embodiments according to the present invention have been described above; however, the present invention is not limited to the above embodiments and various modifications can be made without departing from the scope of the present invention.

REFERENCE SIGNS LIST

1 SCADA web HMI design device
1a Processor
1b Memory
1c Display
1d Input/output interface
2 Web HMI data
3 SCADA web HMI execution device
3a Processor
3b Memory
3c Display
3d Input interface
3e Network interface
4 Monitor control system (PLC)
5 Communication base
6 RIO
7 Monitor target device
10 Engineering tool
11 Drawing processing
12 Part data generation processing
13 Part data editing processing
14 Web HMI data generation processing
15 Device list generation processing
16 Integration processing
17 Integrated part identifier generation processing
18 Part data change processing
19 Integrated item name generation processing
21 Static display attribute data
22 Runtime attribute data
23 Device list
31 Web server
32 Web browser
41 First part data
42 Second part data
51 First part data A
52 First part data B
53 Second part data A
54 Second part data B
55 Second part data C
61-68 Part
110 Stencil area
111 Drawing area
112 Range specification
110a Prototype of horizontal line part
110b Prototype of vertical line part
110c Prototype of rectangular part
110d Prototype of circular part
311 HMI server runtime
321 HMI web runtime
401-420 Part

The invention claimed is:

1. A SCADA (Supervisory Control And Data Acquisition) web HMI (Human Machine Interface) system comprising a web browser for displaying an HMI screen, the SCADA web HMI system changing an appearance of a part arranged on the HMI screen according to a value of a PLC (Programmable Logic Controller) signal received from a programmable logic controller; wherein the SCADA web HMI system comprising:
one or more processors configured to:
execute the web browser;

generate first part data in which arrangement information of a first part arranged on the HMI screen, a first part identifier for the first part, a first attribute identifier indicating a dynamic display attribute of the first part, and first display information defining a display state of the first part corresponding to an attribute value assigned to the first attribute identifier are associated;

generate second part data in which arrangement information of a second part arranged on the HMI screen, a second part identifier for the second part, a second attribute identifier indicating a dynamic display attribute of the second part, and second display information defining a display state of the second part corresponding to an attribute value assigned to the second attribute identifier are associated;

determine that the first attribute identifier of the first part data and the second attribute identifier of the second part data are an identical attribute identifier;

generate an integrated part identifier based on the first attribute identifier and the second attribute identifier;

change the first part identifier of the first part data and the second part identifier of the second part data to the integrated part identifier;

generate an integrated item name in which a screen identifier of the HMI screen, the integrated part identifier, and the identical attribute identifier are combined; and generate web HMI data, the web HMI data including the arrangement information of the first part, the arrangement information of the second part, the integrated item name, the first display information, the second display information, and a script for changing the display states of the first part and the second part according to the received PLC signal; and wherein the one or more processors is configured to control the web browser to perform:

reading of the web HMI data;

displaying the HMI screen; and changing a display state of the first part based on the first display information and a display state of the second part based on the second display information, according to a value of the received PLC signal in response to the received PLC corresponding to the integrated item name.

2. The SCADA web HMI system according to claim 1, wherein the web HMI data includes:

static display attribute data in which the arrangement information of the first part, the arrangement information of the second part, and the integrated item name are associated; and runtime attribute data in which the integrated item name, the first display information, the second display information, and the script are associated; and wherein the one or more processors is configured to control the web browser to perform:

static display process for reading the static display attribute data and displaying the HMI screen; and dynamic display process for reading the runtime attribute data and, updating the display state of the first part based on the first display information and updating the display state of the second part based on the second display information according to the value of the received PLC signal by using the script in which the integrated item name, the first display information, and the second display information are applied as setting parameters, in response to the received PLC corresponding to the integrated item name.

3. The SCADA web HMI system according to claim 1, wherein the first part and the second part are display parts whose display colors change according to the value of the received PLC signal.

4. The SCADA web HMI system according to claim 1, wherein the first part and the second part are display parts whose display positions change according to the value of the received PLC signal.

5. The SCADA web HMI system according to claim 1, wherein the first part and the second part are display parts whose rotation angles change according to the value of the received PLC signal.

6. A SCADA (Supervisory Control And Data Acquisition) web HMI (Human Machine Interface) system comprising:

processing circuitry;

a display that displays an HMI screen by a web browser; and at least one memory including computer program code, where the at least one memory and the computer program code are configured, with the processing circuitry, to cause the SCADA web HMI system to at least change an appearance of a part arranged on the HMI screen according to a value of a PLC (Programmable Logic Controller) signal received from a programmable logic controller;

generate first part data in which arrangement information of a first part arranged on the HMI screen, a first part identifier for the first part, a first attribute identifier indicating a dynamic display attribute of the first part, and first display information defining a display state of the first part corresponding to an attribute value assigned to the first attribute identifier are associated;

generate second part data in which arrangement information of a second part arranged on the HMI screen, a second part identifier for the second part, a second attribute identifier indicating a dynamic display attribute of the second part, and second display information defining a display state of the second part corresponding to an attribute value assigned to the second attribute identifier are associated;

determine that the first attribute identifier of the first part data and the second attribute identifier of the second part data are an identical attribute identifier;

generate an integrated part identifier based on the first attribute identifier and the second attribute identifier;

change the first part identifier of the first part data and the second part identifier of the second part data to the integrated part identifier;

generate an integrated item name in which a screen identifier of the HMI screen, the integrated part identifier, and the identical attribute identifier are combined; and generate web HMI data, the web HMI data including the arrangement information of the first part, the arrangement information of the second part, the integrated item name, the first display information, the second display information, and a script for changing the display states of the first part and the second part according to the received PLC signal;

control the web browser to perform reading of the web HMI data;

control the web browser to perform displaying the HMI screen on the display; and control the web browser to perform changing a display state of the first part based on the first display information and a display state of the second part based on the second display information, according to a value of the received PLC signal in response to the received PLC corresponding to the integrated item name.

7. The SCADA web HMI system according to claim 6, wherein the web HMI data includes:

static display attribute data in which the arrangement information of the first part, the arrangement information of the second part, and the integrated item name are associated; and runtime attribute data in which the integrated item name, the first display information, the second display information, and the script are associated; and wherein the processing circuitry is configured to control the web browser to perform:

static display process for reading the static display attribute data and displaying the HMI screen; and dynamic display process for reading the runtime attribute data and, updating the display state of the first part based on the first display information and updating the display state of the second part based on the second display information according to the value of the received PLC signal by using the script in which the integrated item name, the first display information, and the second display information are applied as setting parameters, in response to the received PLC corresponding to the integrated item name.

8. The SCADA web HMI system according to claim 6, wherein the first part and the second part are display parts whose display colors change according to the value of the received PLC signal.

9. The SCADA web HMI system according to claim 6, wherein the first part and the second part are display parts whose display positions change according to the value of the received PLC signal.

10. The SCADA web HMI system according to claim 6, wherein the first part and the second part are display parts whose rotation angles change according to the value of the received PLC signal.

* * * * *